(12) United States Patent
Wang et al.

(10) Patent No.: US 12,429,980 B1
(45) Date of Patent: Sep. 30, 2025

(54) METHOD FOR DETECTING DAMAGES OF TOUCH DISPLAY PANEL

(71) Applicant: Novatek Microelectronics Corp., Hsinchu (TW)

(72) Inventors: Chia-Wei Wang, Hsinchu (TW); Kai-Chung Tsai, Hsinchu (TW); Yu-Ting Liou, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/885,762

(22) Filed: Sep. 16, 2024

Related U.S. Application Data

(60) Provisional application No. 63/650,924, filed on May 23, 2024.

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
USPC .................................................. 345/173–174
See application file for complete search history.

(56) References Cited

U.S. PATENT DOCUMENTS

| | | | | |
|---|---|---|---|---|
| 9,952,720 B2 * | 4/2018 | Schwartz | ............. | G06F 3/0446 |
| 10,720,106 B2 | 7/2020 | Chang et al. | | |
| 2013/0320994 A1 * | 12/2013 | Brittain | ................. | G06F 3/0416 |
| | | | | 324/537 |
| 2019/0156757 A1 | 5/2019 | Chang et al. | | |
| 2020/0089382 A1 * | 3/2020 | Gray | ..................... | G06F 3/0416 |
| 2022/0187939 A1 * | 6/2022 | Lee | ........................ | G06F 3/0416 |
| 2023/0110133 A1 * | 4/2023 | Dhar | ........................ | G06F 3/045 |
| | | | | 345/173 |
| 2023/0135676 A1 * | 5/2023 | Kim | ..................... | G06F 3/04164 |
| | | | | 345/173 |

FOREIGN PATENT DOCUMENTS

| | | | | |
|---|---|---|---|---|
| CN | 113568519 | | 10/2021 | |
| DE | 102012009844 A1 * | | 11/2012 | ............. G06F 3/047 |
| TW | 201926299 | | 7/2019 | |
| WO | 2013158325 | | 10/2013 | |
| WO | WO-2020245555 A1 * | | 12/2020 | ........... G06F 3/0412 |

OTHER PUBLICATIONS

"Office Action of Taiwan Counterpart Application", issued on Jul. 8, 2025, p. 1-p. 5.

* cited by examiner

*Primary Examiner* — Kwin Xie
(74) *Attorney, Agent, or Firm* — JCIPRNET

(57) ABSTRACT

A method for detecting damages of a touch display panel is provided. The touch display panel includes a plurality of sensing pads and a plurality of signal lines. The method includes: selecting at least one first device of the sensing pads and the signal lines as a device under test (DUT); apply a first voltage to the DUT and receiving a feedback signal from the DUT, wherein the feedback signal comprises voltage information or capacitance information of the DUT; and determining whether the DUT is damaged according to the feedback signal.

13 Claims, 19 Drawing Sheets

METHOD FOR DETECTING DAMAGES OF TOUCH DISPLAY PANEL

CROSS-REFERENCE TO RELATED APPLICATION

This application claims the priority benefit of U.S. provisional application Ser. No. 63/650,924, filed on May 23, 2024. The entirety of the above-mentioned patent application is hereby incorporated by reference herein and made a part of this specification.

BACKGROUND

Technical Field

The invention relates to a detecting method, and in particular, to a method for detecting damages of a touch display panel.

Description of Related Art

TDDI (Touch with Display Driver) is a touch technology solution that integrates a panel driver IC and a touch panel IC into a single chip. In the case of a touch abnormality (e.g. sensor damage) or display abnormality (e.g., source line or gate line damage), since there is no detection mechanism in the IC, it is typically detected by manual touch or human eye observation. In order to enhance the safety coefficient, the automotive industry is striving to improve the panel touch and display monitoring function by IC, thus enabling the system to automatically report irregularities to achieve the goal of warning and strengthening driving safety.

SUMMARY

The invention is directed to a detecting method, capable of detecting device abnormality of the touch display panel.

An embodiment of the invention provides a method for detecting damages of a touch display panel. The touch display panel includes a plurality of sensing pads and a plurality of signal lines. The method includes: selecting at least one first device of the sensing pads and the signal lines as a device under test (DUT); apply a first voltage to the DUT and receiving a feedback signal from the DUT, wherein the feedback signal comprises voltage information or capacitance information of the DUT; and determining whether the DUT is damaged according to the feedback signal.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
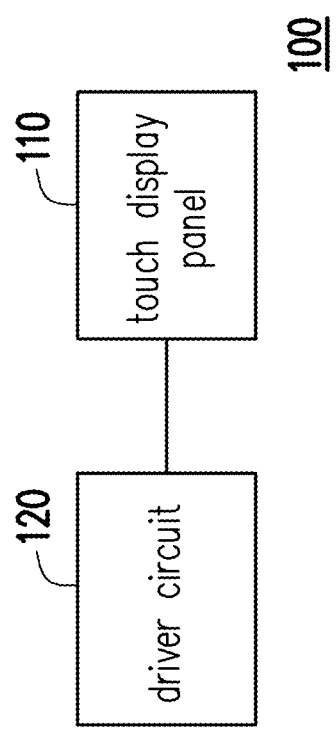
FIG. 1 is a block diagram illustrating a touch display apparatus according to an embodiment of the invention.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms "first" and "second" mentioned in the full text of the specification of the disclosure (including claims) are used to name elements or to distinguish different embodiments or scopes, neither to be used to limit upper or lower limit of the number of elements nor limit the sequence of the elements. In addition, wherever possible, elements/components/steps with the same reference numbers are used in the drawings and embodiments to represent the same or similar parts. Elements/components/steps using the same numbers or using the same terms in different embodiments may serve as cross-reference for each other.

FIG. 1 is a block diagram illustrating a touch display apparatus according to an embodiment of the invention. Referring to FIG. 1, the touch display apparatus 100 includes a touch display panel 110 and a driver circuit 120. The driver circuit 120 is configured to drive the touch display panel 110 to perform a display operation and a touch sensing operation. In an embodiment, the driver circuit 120 may be a touch with display driver integrated circuit (TDDI IC), but the invention is not limited thereto.

In the present embodiment, the driver circuit 120 is further configured to perform a method for detecting damages of the touch display panel 110. The damages of the touch display panel 110 indicates that sensing pads, source lines, or gate lines are open themselves, or sensing pads, source lines, or gate lines are shorted to adjacent sensing pads, source lines, or gate lines.

Figure 2:
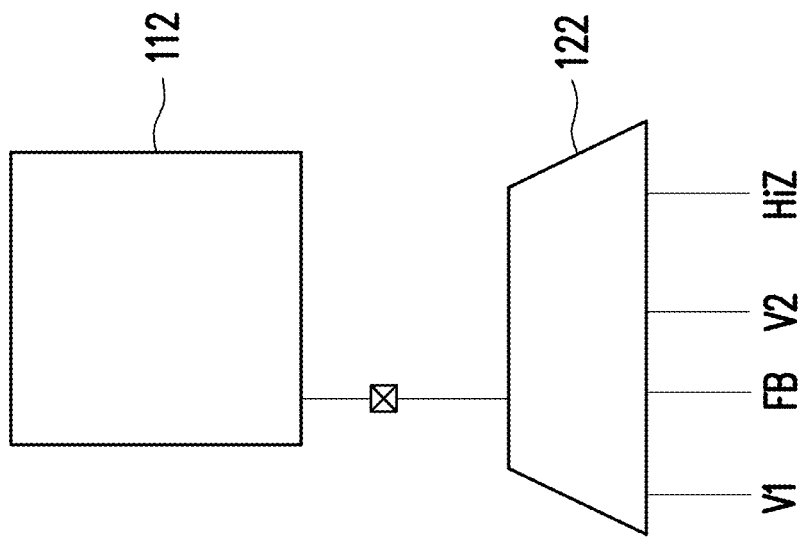
FIG. 2 is a schematic diagram illustrating a detecting scheme according to an embodiment of the invention.

To be specific, FIG. 2 is a schematic diagram illustrating a detecting scheme according to an embodiment of the invention. Referring to FIG. 1 and FIG. 2, the touch display panel 110 includes a plurality of sensing pads 112 for sensing a touch event. The driver circuit 120 includes a plurality of switch circuits 122 for signal selection. For clarity, only one sensing pad 112 and one switch circuit 122 are shown in FIG. 2, but the number of the sensing pads 112 and the switch circuits 122 is not intended to limit the invention. In an embodiment, the switch circuit 122 may include at least one multiplexer for transmitting and receiving signals, but the invention is not limited thereto.

During a detection period, the sensing pad 112 may serve as a device under test (DUT), and the switch circuit 122 is switched to select a first voltage V1 to be applied to the sensing pad 112 and receive a feedback signal FB from the sensing pad 112 in different times. During another detection period, the sensing pad 112 may serve as a reference device for detecting other sensing pads, and the switch circuit 122 is switched to select a second voltage V2 to be applied to the sensing pad 112 or make the sensing pad 112 be in a floating state or in a high impedance state HiZ. In an embodiment, the second voltage V2 may a ground voltage, but the invention is not limited thereto.

Figure 3:
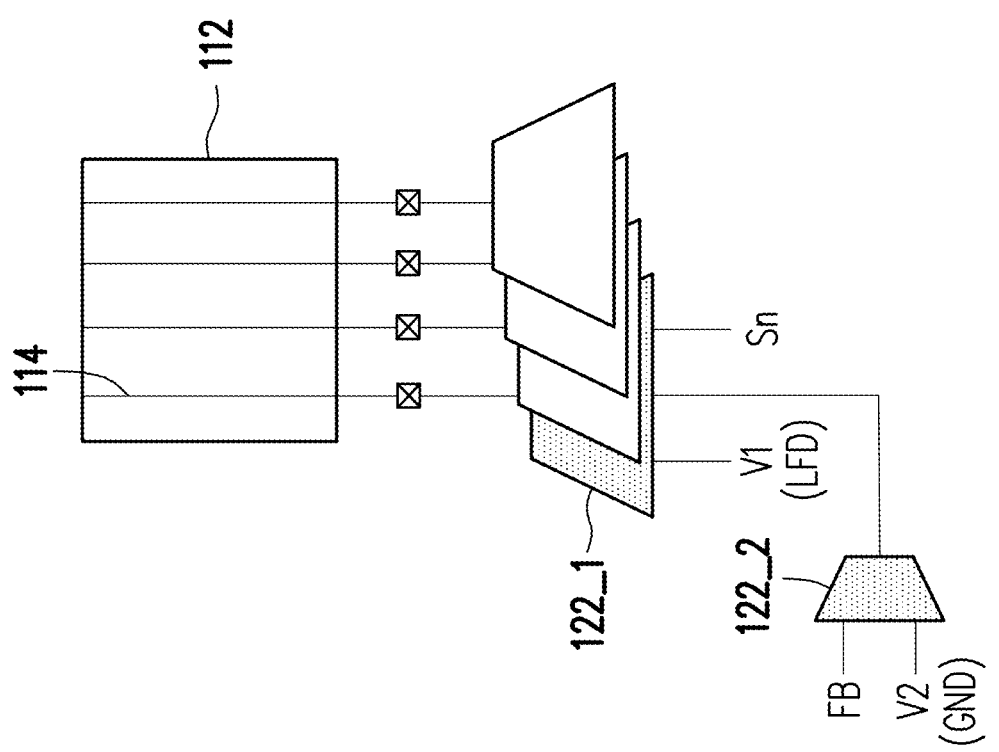
FIG. 3 is a schematic diagram illustrating a detecting scheme according to another embodiment of the invention.

FIG. 3 is a schematic diagram illustrating a detecting scheme according to another embodiment of the invention. Referring to FIG. 3, the touch display panel 110 further includes a plurality of source lines 114 for the display operation and a plurality of first switch circuits 122_1, and a plurality of second switch circuits 122_2 are added for damage detection. For clarity, only one first switch circuit 122_1 and one second switch circuit 122_2 are shown in FIG. 3, but the numbers of the first switch circuits 122_1 and the second switch circuits 122_2 are not intended to limit the invention.

In the present embodiment, the first voltage V1 may be a load free driving (LFD) signal LFD, and the second voltage V2 may be a ground voltage GND. In another embodiment, the first voltage V1 may be a direct-current (DC) voltage, but the invention is not limited thereto. During a display period and a touch sensing period, the first voltage V1, the second voltage V2, and a data signal Sn are applied to respective devices of the touch display panel 110 for the display operation and the touch sensing operation.

During the detection period, the first voltage V1 and the second voltage V2 are applied to respective devices of the touch display panel 110 for the damage detection. For example, the sensing pad 112 may serve as a DUT, and at least one of the source lines 114 may serve as a reference device. The first voltage V1 is applied to the sensing pad 112, and the second voltage V2 is applied to the source line 114. The feedback signal FB can be received from the sensing pad 112 to determine whether the sensing pad 112 is damaged.

In another embodiment, the at least one of the source lines 114 may serve as a DUT, and sensing pad 112 may serve as a reference device. The first voltage V1 is applied to the source line 114, and the second voltage V2 is applied to the sensing pad 112. The feedback signal FB can be received from the source line 114 to determine whether the source line 114 is damaged.

Figure 4:
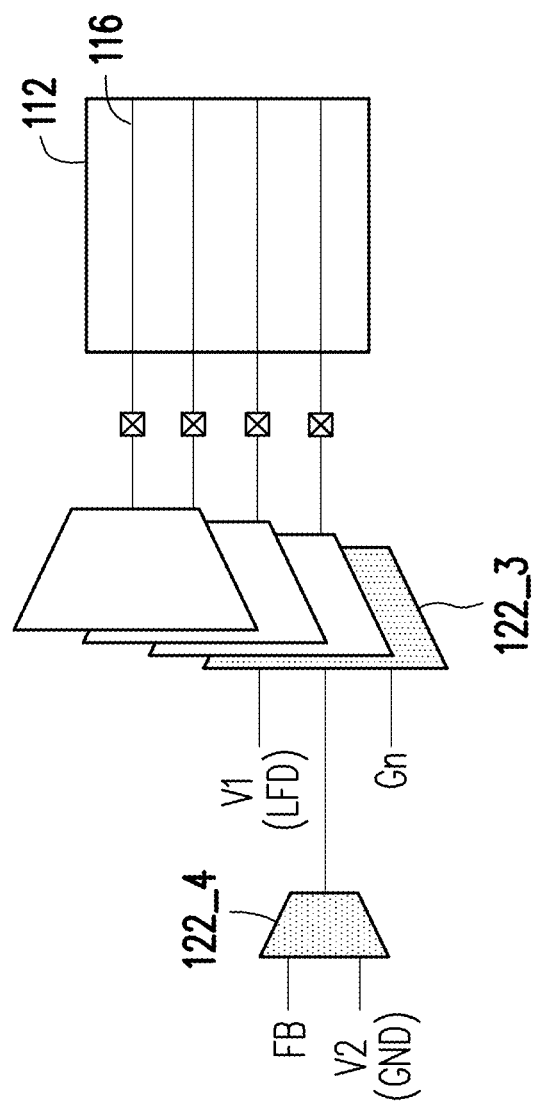
FIG. 4 is a schematic diagram illustrating a detecting scheme according to another embodiment of the invention.

FIG. 4 is a schematic diagram illustrating a detecting scheme according to another embodiment of the invention. Referring to FIG. 4, the touch display panel 110 further includes a plurality of gate lines 116 for the display operation and a plurality of first switch circuits 122_3, and a plurality of second switch circuits 122_4 are added for damage detection. For clarity, only one first switch circuit 122_3 and one second switch circuit 122_4 are shown in FIG. 4, but the numbers of the first switch circuits 122_3 and the second switch circuits 122_4 are not intended to limit the invention.

During the detection period, the first voltage V1 and the second voltage V2 are applied to respective devices of the touch display panel 110 for the damage detection. The feedback signal FB can be received from the sensing pad 112 or at least one of the gate lines 116 to determine whether the sensing pad 112 or the at least one of the gate lines 116 is damaged.

Figure 5A:
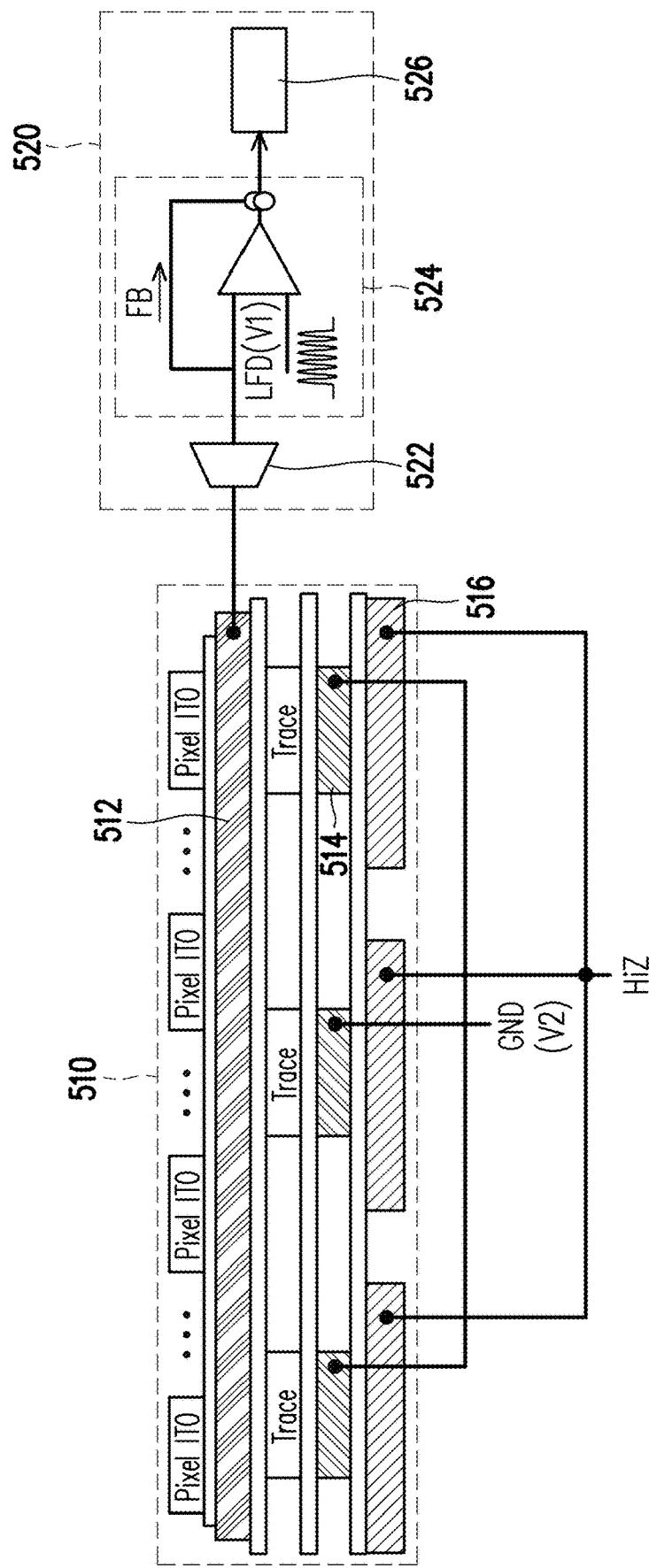
FIG. 5A is a schematic diagram illustrating a case that sensing pads are detected according to an embodiment of the invention.

FIG. 5A is a schematic diagram illustrating a case that sensing pads are detected according to an embodiment of the invention. Referring to FIG. 5A, the driver circuit 520 is configured to detect whether a sensing pad is open itself.

The driver circuit 520 includes a switch circuit 522, an analog-front-end (AFE) circuit 524, and a processor circuit 526. Input signals are respectively set for sensing pads 512, source lines 514 and gate lines 516. For example, the LFD signal LFD is applied to the sensing pad 512, and the source lines 514 are grounded. The gate lines 516 are set to the high impedance state HiZ. In an embodiment, the processor circuit 526 may include an analog-to-digital converter (ADC).

The AFE circuit 524 receives the feedback signal FB from the sensing pad 512 via the switch circuit 522, and outputs the feedback signal FB to the processor circuit 526 for data processing. The feedback signal FB includes voltage information or capacitance information of the sensing pad 512. The driver circuit 520 can determines whether the sensing pad 512 is damaged according to the feedback signal FB.

Regarding hardware structures of the driver circuit 520, the processor circuit 526 may be a processor having computational capability. In addition, enough teaching, suggestion, and implementation illustration for hardware structures of the switch circuit 522, the AFE circuit 524, and the processor circuit 526 can be obtained with reference to common knowledge in the related art, which is not repeated hereinafter.

Figure 5B:
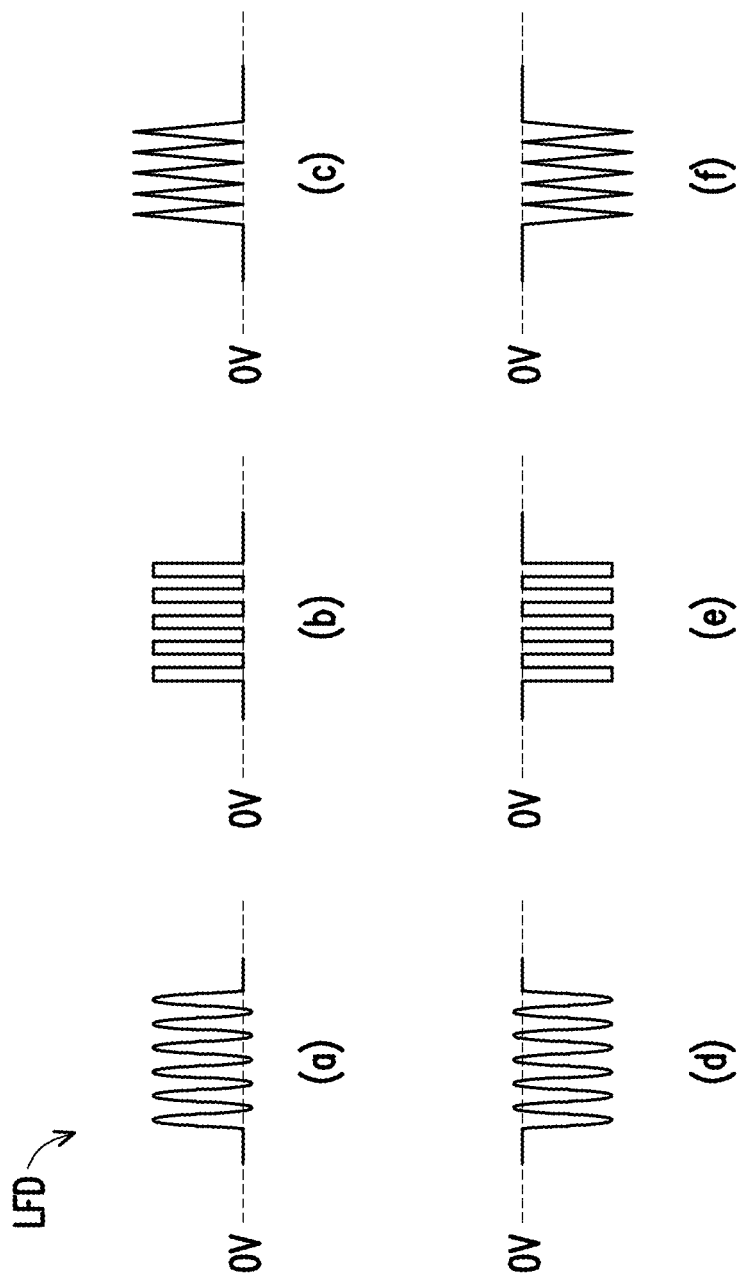
FIG. 5B illustrates different waveforms of the LFD signal according to embodiments of the invention.

In FIG. 5A, the LFD signal LFD is a positive sine wave, but the invention is not limited thereto. FIG. 5B illustrates different waveforms of the LFD signal according to embodiments of the invention. Referring to FIG. 5B, (a) of FIG. 5B shows the LFD signal LFD is a positive sine wave. (b) and (c) of FIG. 5B respectively show the LFD signal LFD is a positive square wave and a positive triangle wave. In addition, the LFD signal LFD may be a negative voltage. For example, (d), (e) and (f) of FIG. 5B respectively show the LFD signal LFD is a negative sine wave, a negative square wave and a negative triangle wave. The waveforms illustrated in FIG. 5B are not intended to limit the invention.

Figure 6:
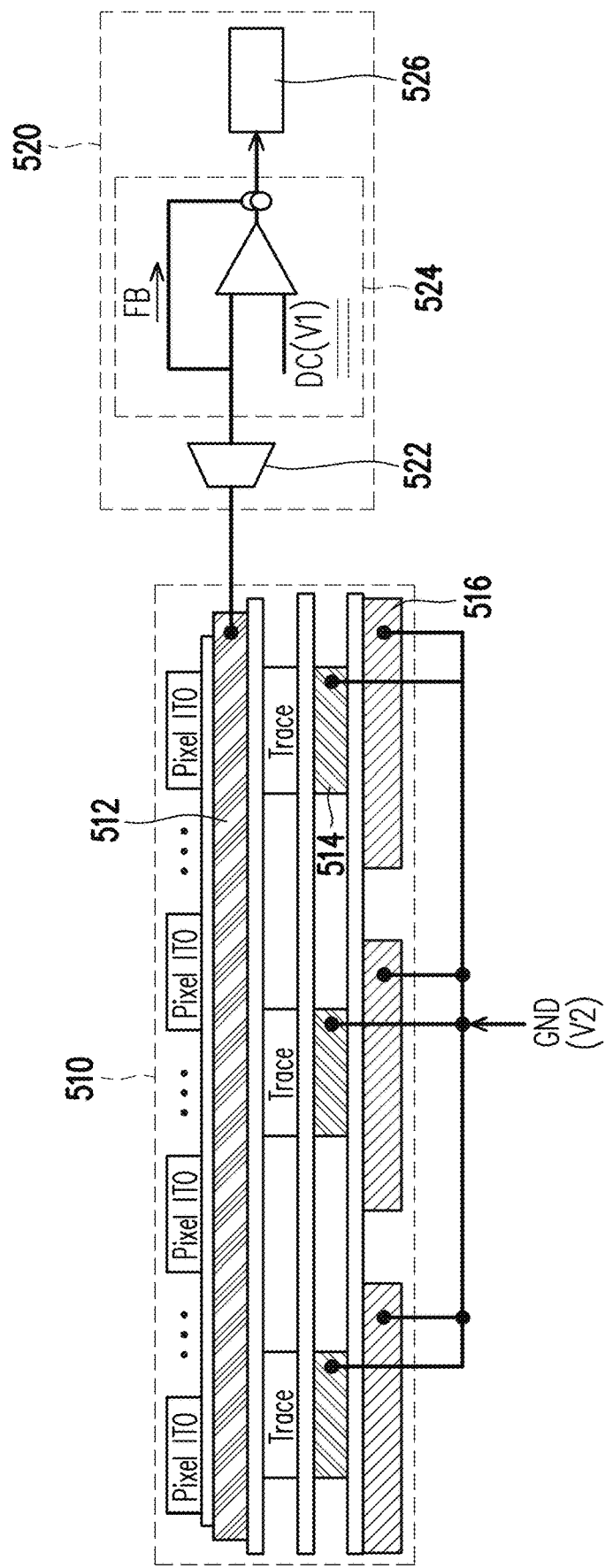
FIG. 6 is a schematic diagram illustrating another case that sensing pads are detected according to an embodiment of the invention.

FIG. 6 is a schematic diagram illustrating another case that sensing pads are detected according to an embodiment of the invention. Referring to FIG. 6, the driver circuit 520 is configured to detect whether a sensing pad is shorted to adjacent sensing pads, source lines or gate lines. In the present embodiment, the DC signal DC is applied to the sensing pad 512, and the source lines 514 and the gate lines 516 are grounded.

Figure 7:
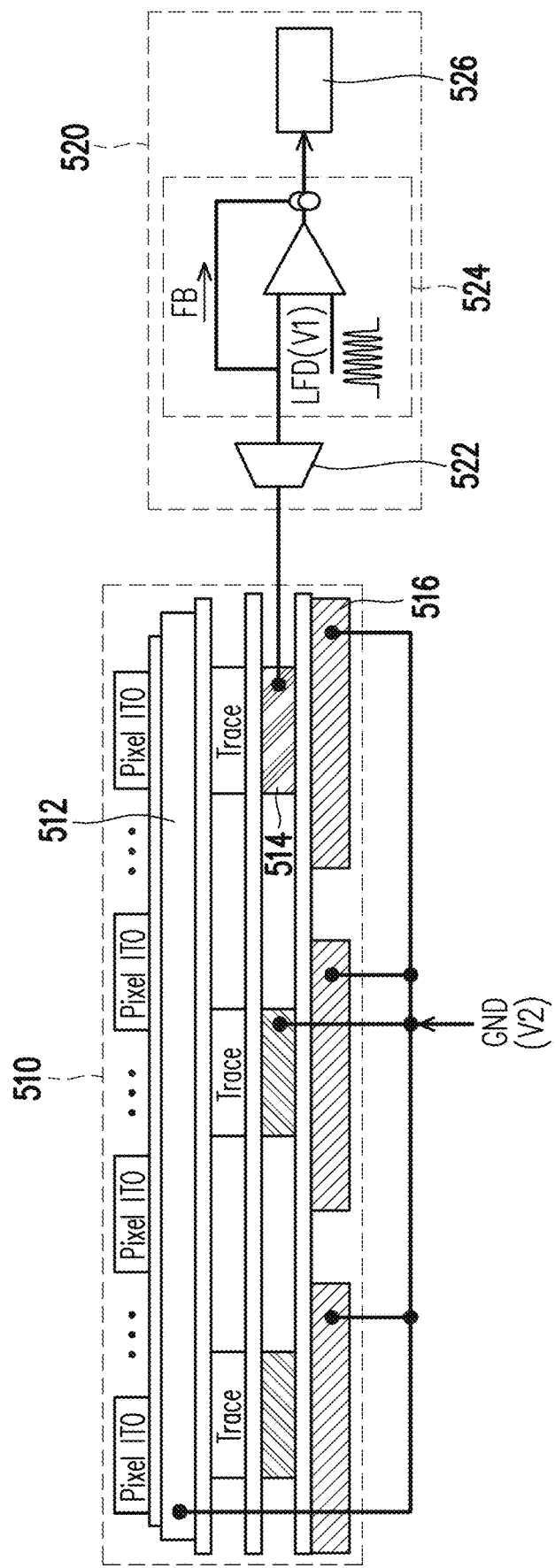
FIG. 7 is a schematic diagram illustrating a case that source lines are detected according to an embodiment of the invention.

FIG. 7 is a schematic diagram illustrating a case that source lines are detected according to an embodiment of the invention. Referring to FIG. 7, the driver circuit 520 is configured to detect whether a source line is open itself. In the present embodiment, the LFD signal LFD is applied to the source line 514 to be detected, and the sensing pad 512, the adjacent source line, and the gate lines 516 are grounded.

Figure 8:
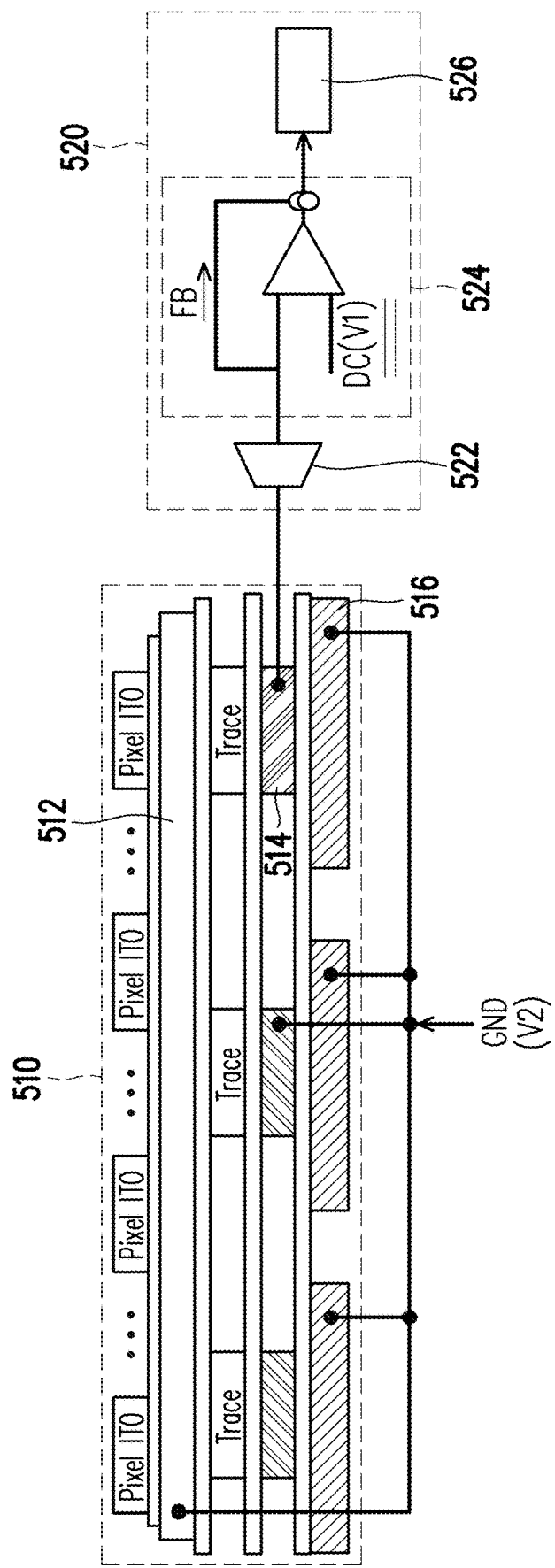
FIG. 8 is a schematic diagram illustrating another case that source lines are detected according to an embodiment of the invention.

FIG. 8 is a schematic diagram illustrating another case that source lines are detected according to an embodiment of the invention. Referring to FIG. 8, the driver circuit 520 is configured to detect whether a source line is shorted to adjacent sensing pads, source lines or gate lines. In the present embodiment, the DC signal DC is applied to the source line 514 to be detected, and the sensing pad 512, the adjacent source line and the gate lines 516 are also grounded.

Figure 9:
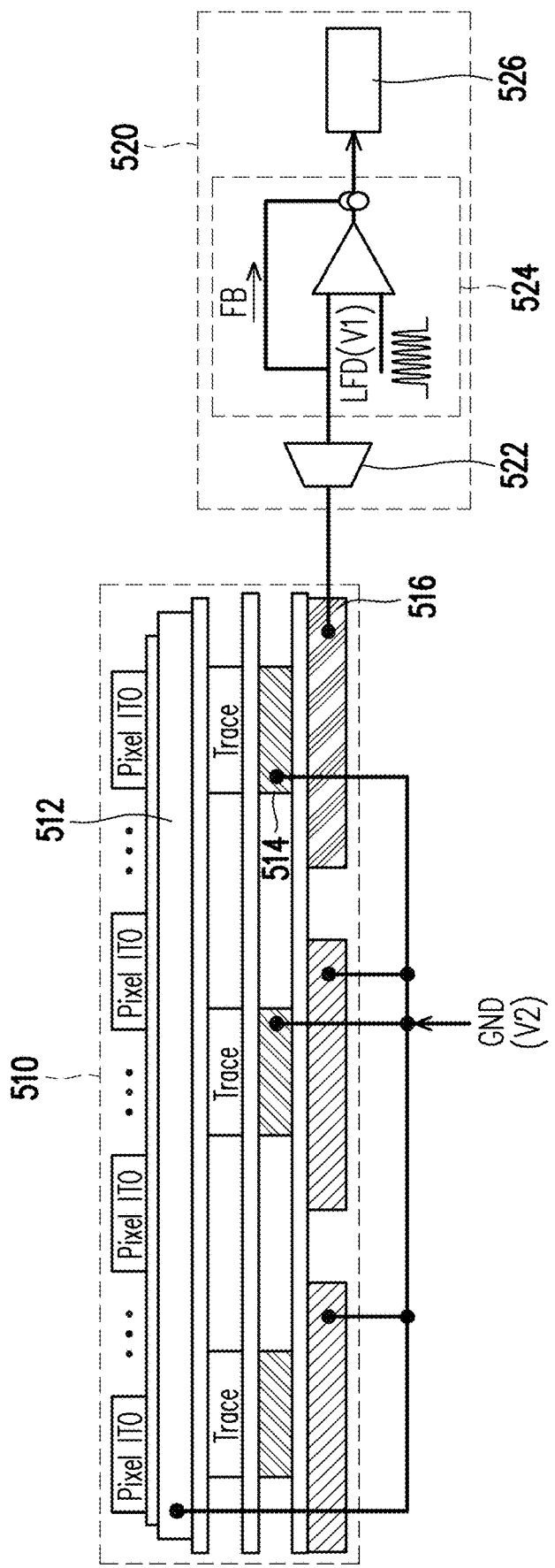
FIG. 9 and FIG. 10 respectively illustrate different cases that gate lines are detected according to embodiments of the invention.
Figure 10:
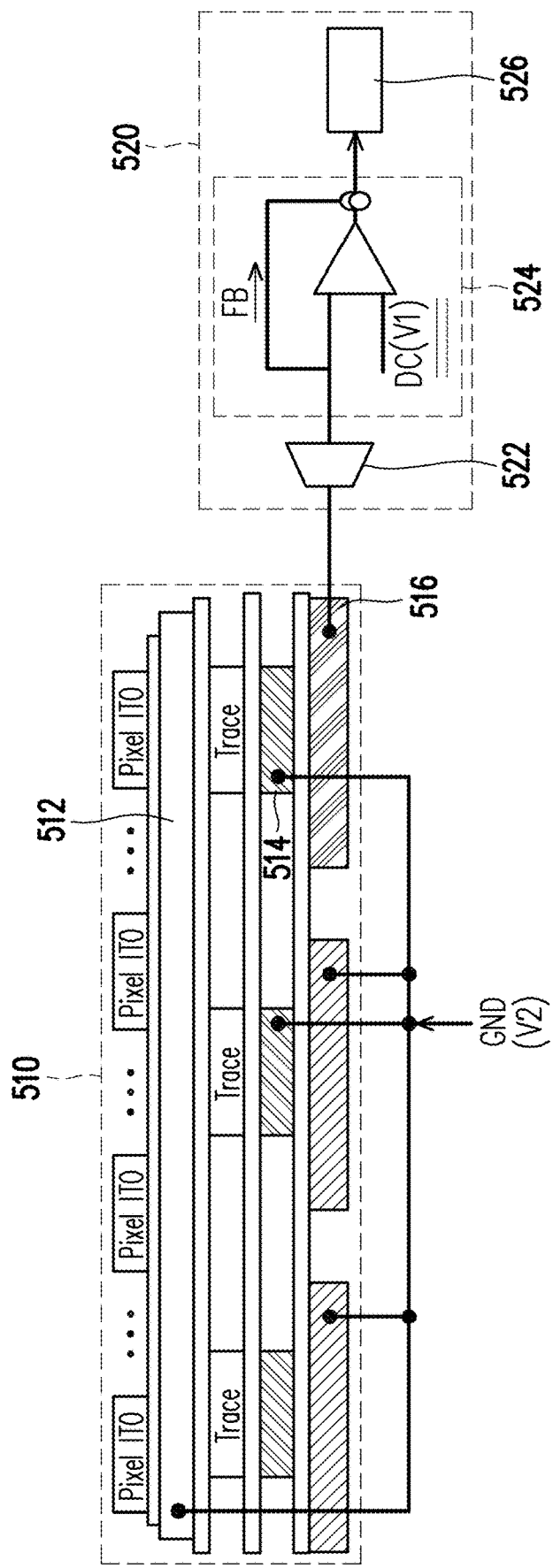

FIG. 9 and FIG. 10 respectively illustrate different cases that gate lines are detected according to embodiments of the invention. Referring to FIG. 9 and FIG. 10, in FIG. 9, the driver circuit 520 is configured to detect whether a gate line is open itself, and in FIG. 10, the driver circuit 520 is configured to detect whether a gate line is shorted to adjacent sensing pads, source lines or gate lines. The LFD signal LFD is applied to the gate line 516 to be detected for open detection, and the DC signal DC is applied to the gate line 516 for short detection. The sensing pad 512, the source lines 514, and the adjacent gate lines are grounded in the two cases.

Figure 11:
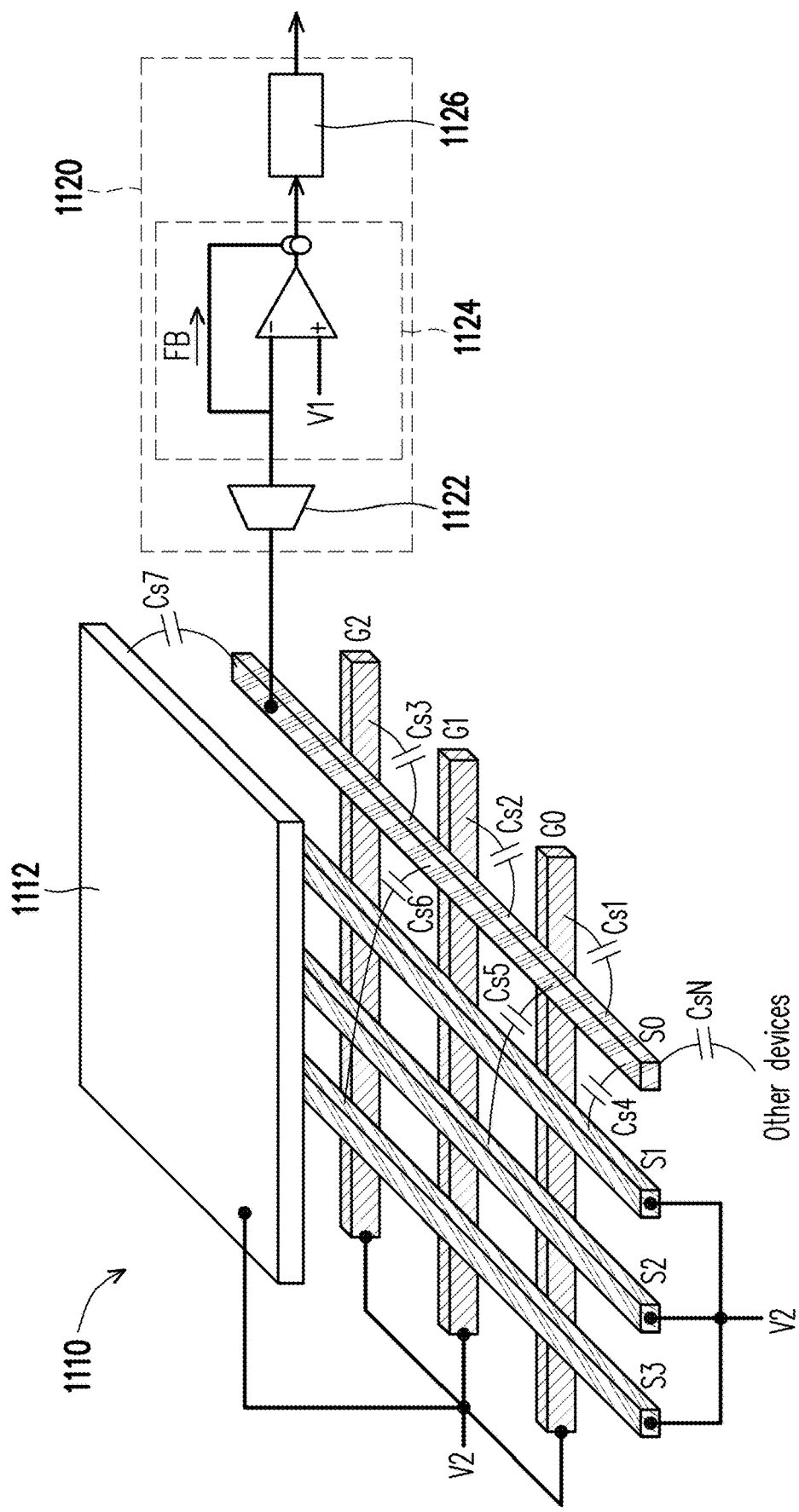
FIG. 11 is a schematic diagram illustrating another case that source lines are detected according to an embodiment of the invention.
Figure 12:
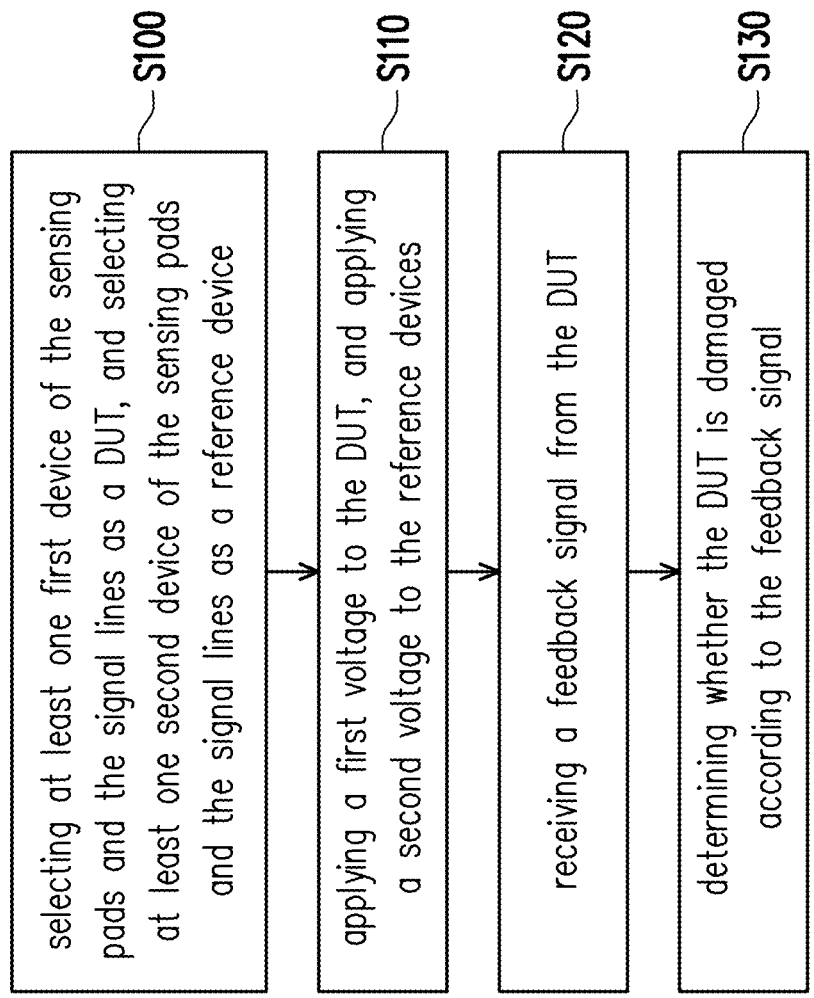
FIG. 12 is a flowchart illustrating steps in a method for detecting damages of a touch display panel according to an embodiment of the invention.

FIG. 11 is a schematic diagram illustrating another case that source lines are detected according to an embodiment of the invention. FIG. 12 is a flowchart illustrating steps in a method for detecting damages of a touch display panel according to an embodiment of the invention. Referring to FIG. 11 and FIG. 12, a touch display panel 1110 includes a plurality of sensing pads 1112 and a plurality of signal lines, wherein the signal lines are source lines S0, S1, S2, S3 and gate lines G0, G1, G2 of the touch display panel 1110.

In step S100, during the detection period, the driver circuit 1120 selects at least one first device of the sensing pads 1112 and the signal lines S0, S1, S2, S3 and G0, G1, G2 as a DUT, and selects at least one second device of the sensing pads 1112 and the signal lines S0, S1, S2, S3 and G0, G1, G2 as a reference device. In FIG. 11, the source line S0 is selected as the DUT, and the sensing pad 1112, the source lines S1, S2, S3, and the gate lines G0, G1, G2 are selected as reference devices. The reference devices 1112, S1, S2, S3 and G0, G1, G2 are adjacent to the DUT S0.

In step S110, the driver circuit 1120 applies a first voltage V1 to the DUT S0, and applies a second voltage V2 to the reference devices 1112, S1, S2, S3 and G0, G1, G2. In an embodiment, the first voltage V1 may be a LFD signal or a DC voltage, and the second voltage V2 may be a ground voltage. In an embodiment, the driver circuit 1120 may make the reference devices 1112, S1, S2, S3 and G0, G1, G2 be in a floating state or in a high impedance state.

In step S120, the driver circuit 1120 receives a feedback signal FB from the DUT S0, wherein the feedback signal FB includes voltage information or capacitance information of the DUT S0. For example, the capacitance information includes capacitance values Cs1, Cs2, . . . , CsN between the DUT S0 and the reference devices 1112, S1, S2, S3 and G0, G1, G2, as illustrated in FIG. 11. The DUT S0 and the reference devices 1112, S1, S2, S3 and G0, G1, G2 have a first capacitance value Cs=Cs1+Cs2+ . . . +Cs7+ . . . +CsN in a normal state, wherein N is a positive integer.

On the other hand, the DUT S0 is connected to the AFE circuit 1124 with operational amplifier virtual short circuit feature, and thus the DUT S0 can be maintained at the first voltage V1. In addition, the input signal of the reference devices 1112, S1, S2, S3 and G0, G1, G2 is the second voltage V2. Therefore, the voltage information includes a first voltage difference value $\Delta V$ between the DUT S0 and the reference devices 1112, S1, S2, S3 and G0, G1, G2 in the normal state, wherein $\Delta V$=V1−V2.

In the present embodiment, the driver circuit 1120 switches a switch circuit 1122 to apply the first voltage V1 to the DUT S0, apply the second voltage V2 to the reference devices 1112, S1, S2, S3 and G0, G1, G2, or receive the feedback signal FB from the DUT S0. For a detailed description of the switching operation of the switch circuit 1122, please refer to the embodiments provided in FIG. 2 to FIG. 4.

In step S130, the driver circuit 1120 determines whether the DUT S0 is damaged according to the feedback signal FB, wherein the damage of the DUT S0 indicates that the DUT S0 is open itself or shorted to the adjacent sensing pads 1112 or the adjacent signal lines S1, S2, S3 and G0, G1, G2. The driver circuit 1120 can analyze the capacitance information and the voltage information of the DUT S0 to obtain a detection result via a processor circuit 1126 and/or other back-end circuits.

Figure 13:
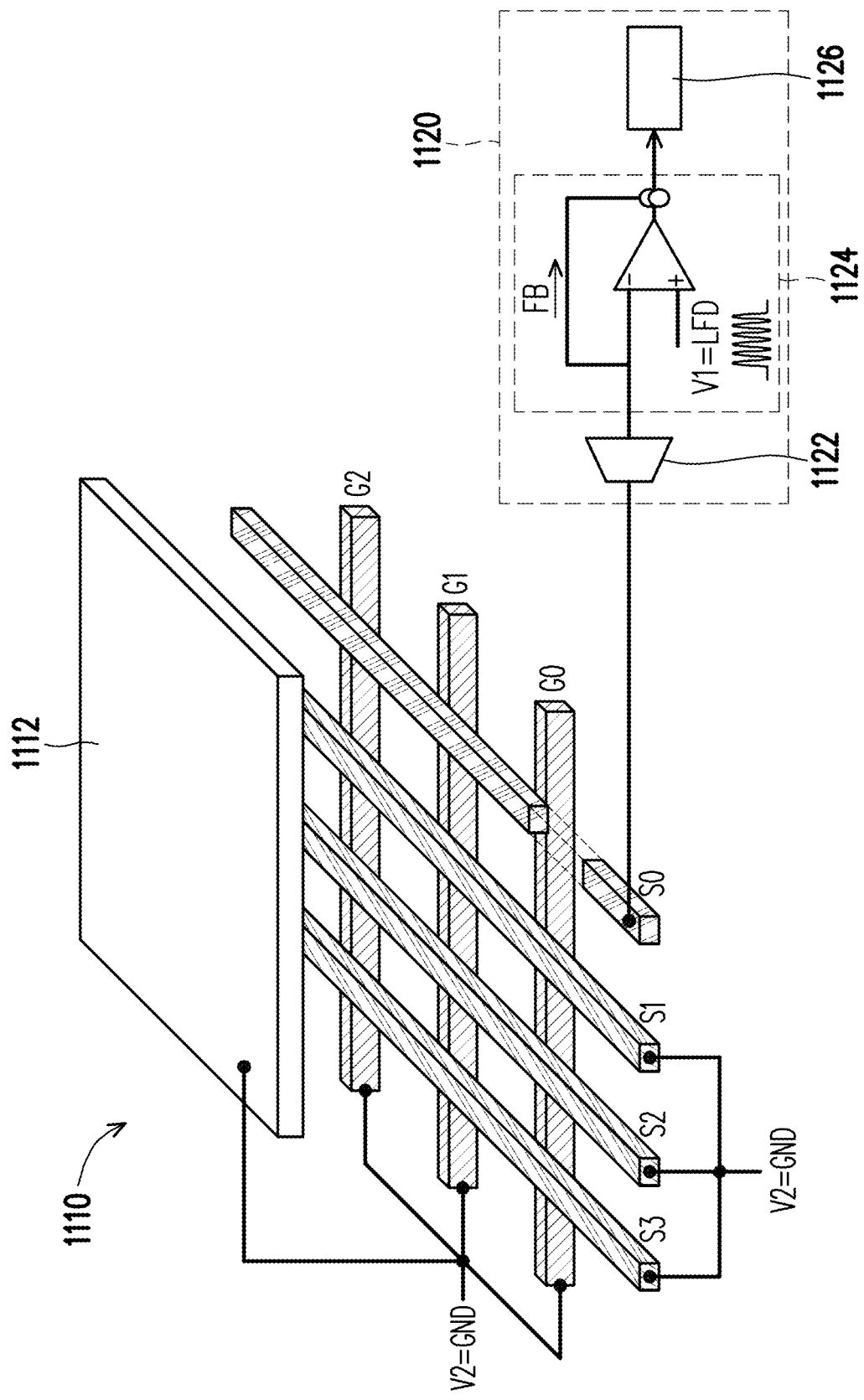
FIG. 13 is a schematic diagram illustrating a case that the DUT is open itself according to an embodiment of the invention.

FIG. 13 is a schematic diagram illustrating a case that the DUT is open itself according to an embodiment of the invention. Referring to FIG. 11 and FIG. 13, the DUT S0 is in an abnormal state, e.g. open itself. In the open state, the DUT S0 and the reference devices 1112, S1, S2, S3 and G0, G1, G2 have a second capacitance value Cs', wherein the first capacitance value Cs is larger than the second capacitance value Cs' since the first voltage V1 is only applied to the disconnection part of the DUT S0.

For example, the first capacitance value Cs of the normal state and the second capacitance value Cs' of the abnormal state can be listed in the following Table 1:

TABLE 1

| Open test | capacitance value (picofarads) |
| --- | --- |
| normal state | Cs = 180 pF |
| abnormal state | Cs' = 50 pF |

FIG. 11 shows the DUT S0 in the normal state, and FIG. 13 shows the DUT S0 in the abnormal state (open state). The driver circuit 1120 can obtain the capacitance information with receiving the feedback signal FB, and determine whether the DUT S0 is open itself according to the capacitance information and Table 1. The values listed in Table 1 are not intended to limit the invention.

In a similar manner, the driver circuit 1120 can determine whether a sensing pad or a gate line is open itself according to the capacitance information.

Figure 14:
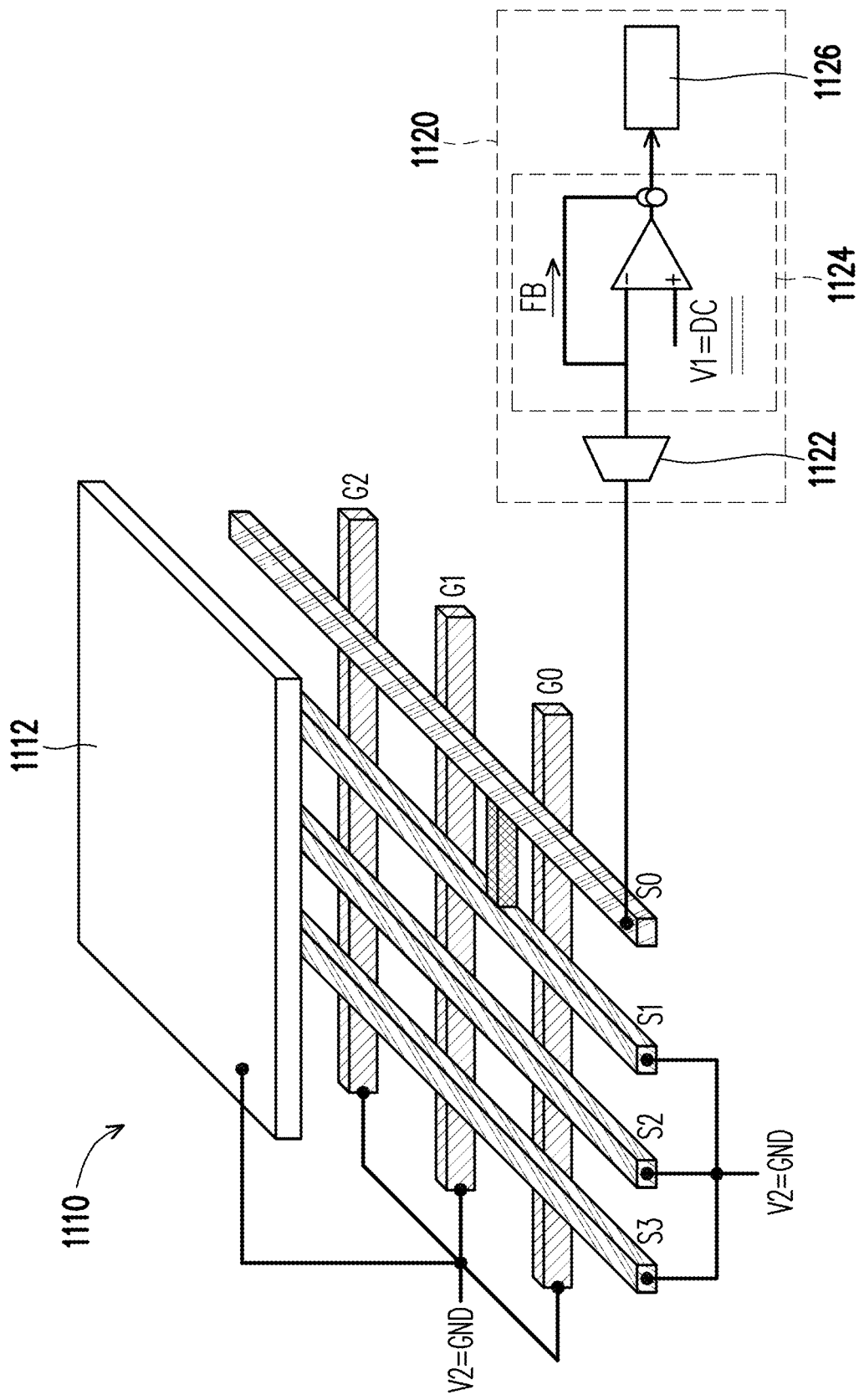
FIG. 14 is a schematic diagram illustrating a case that the DUT is shorted to the adjacent source line according to an embodiment of the invention.

FIG. 14 is a schematic diagram illustrating a case that the DUT is shorted to the adjacent source line according to an embodiment of the invention. Referring to FIG. 11 and FIG. 14, the DUT S0 is in an abnormal state, e.g. shorted to the adjacent source line S1. In the short state, there is a second voltage difference value $\Delta V'$ between the DUT S0 and the source line S1, wherein the first voltage difference value ΔV is larger than the second voltage difference value ΔV' since the DUT S0 is shorted to the source line S1.

For example, when the DUT S0 is shorted to the source line S1, the second voltage difference value ΔV' may be 1 voltage (V). The first voltage difference value ΔV of the normal state and the second voltage difference value ΔV' of the abnormal state can be listed in the following Table 2:

TABLE 2

| Short test | voltage difference value (voltages) |
|---|---|
| normal state | ΔV = 2.75 V |
| abnormal state | ΔV' = 1 V |

FIG. 11 shows the DUT S0 in the normal state, and FIG. 14 shows the DUT S0 in the abnormal state (short state). The driver circuit 1120 can obtain the voltage information with receiving the feedback signal FB, and determine whether the DUT S0 is shorted to the source line S1 according to the voltage information and Table 2. The values listed in Table 2 are not intended to limit the invention.

In a similar manner, the driver circuit 1120 can determine whether the DUT S0 is shorted to the adjacent sensing pads or the adjacent gate lines according to the voltage information.

Figure 15:
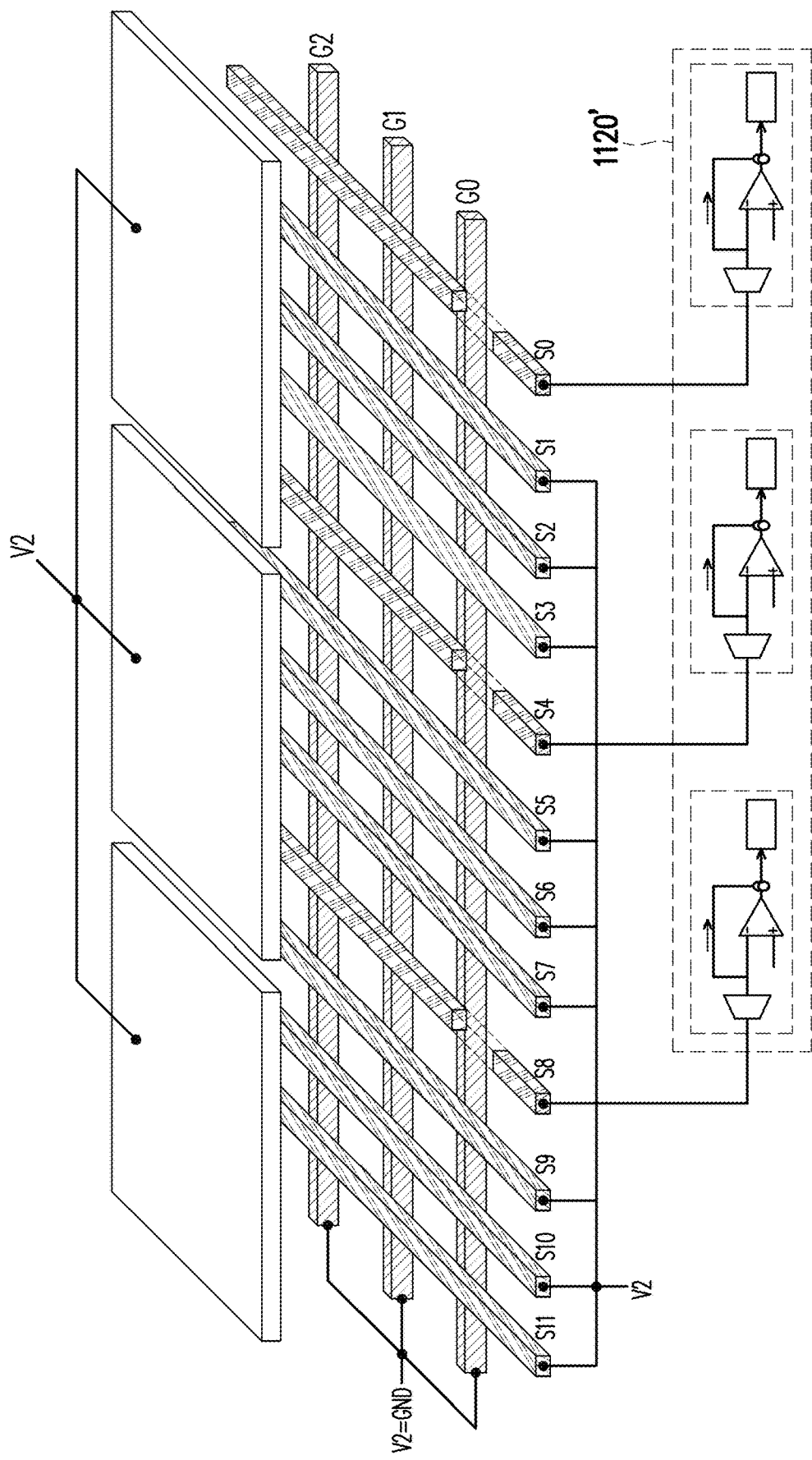
FIG. 15 illustrates a plurality of the source lines are detected at the same time according to an embodiment of the invention.

In FIG. 11, only one source line S0 is selected as the DUT, but the invention is not limited thereto. FIG. 15 illustrates a plurality of the source lines are detected at the same time according to an embodiment of the invention. Referring to FIG. 15, taking the open test for example, the source lines S0, S4, S8 are selected to be detected at the same time. In this case, the driver circuit 1120' includes a plurality of switch circuits, a plurality of AFE circuits, and a plurality of processor circuits for testing multiple DUTs. In another embodiment, the plurality of processor circuits may be integrated as a single circuit.

Figure 16:
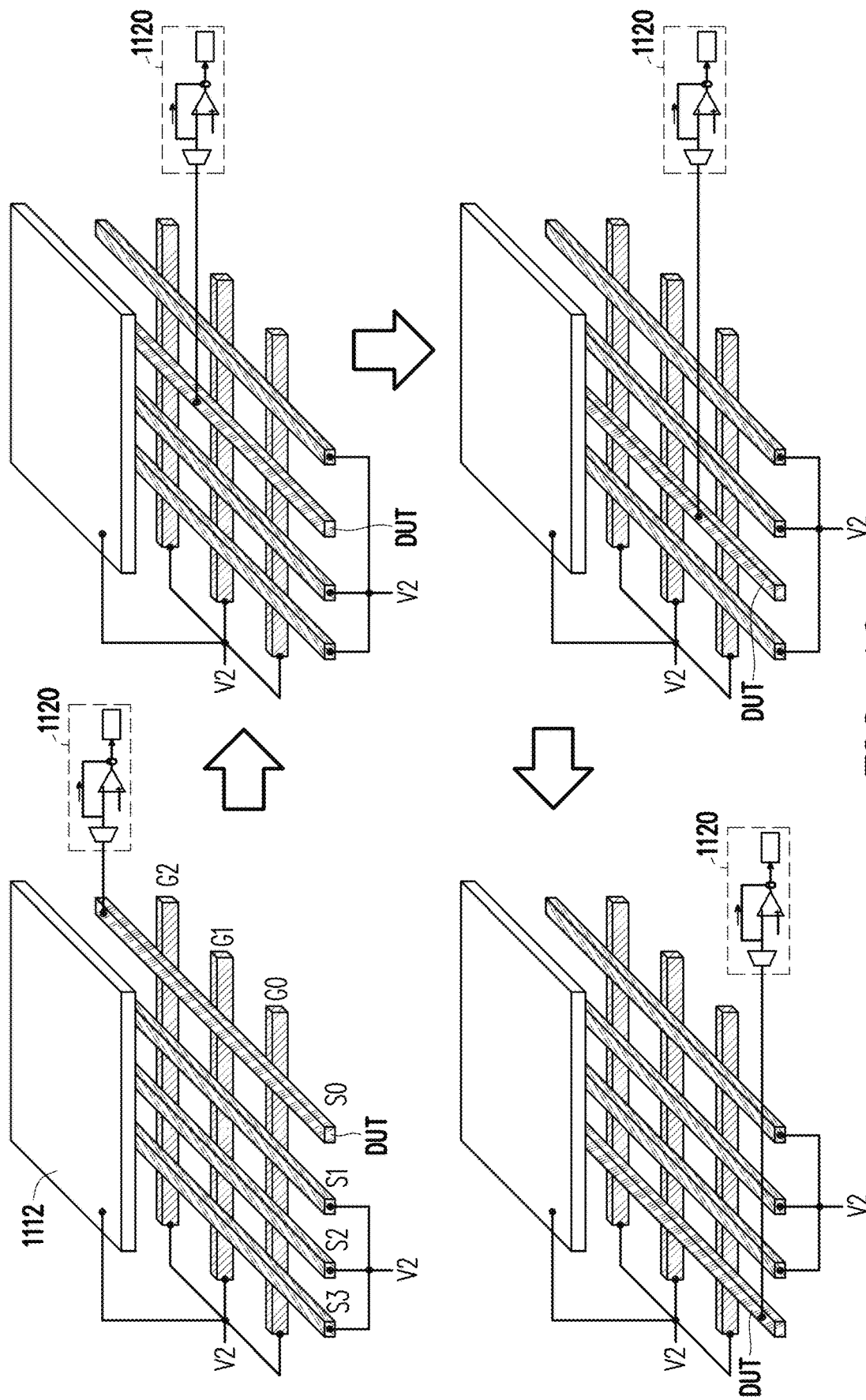
FIG. 16 is a schematic diagram illustrating source lines are sequentially detected according to an embodiment of the invention.
Figure 17:
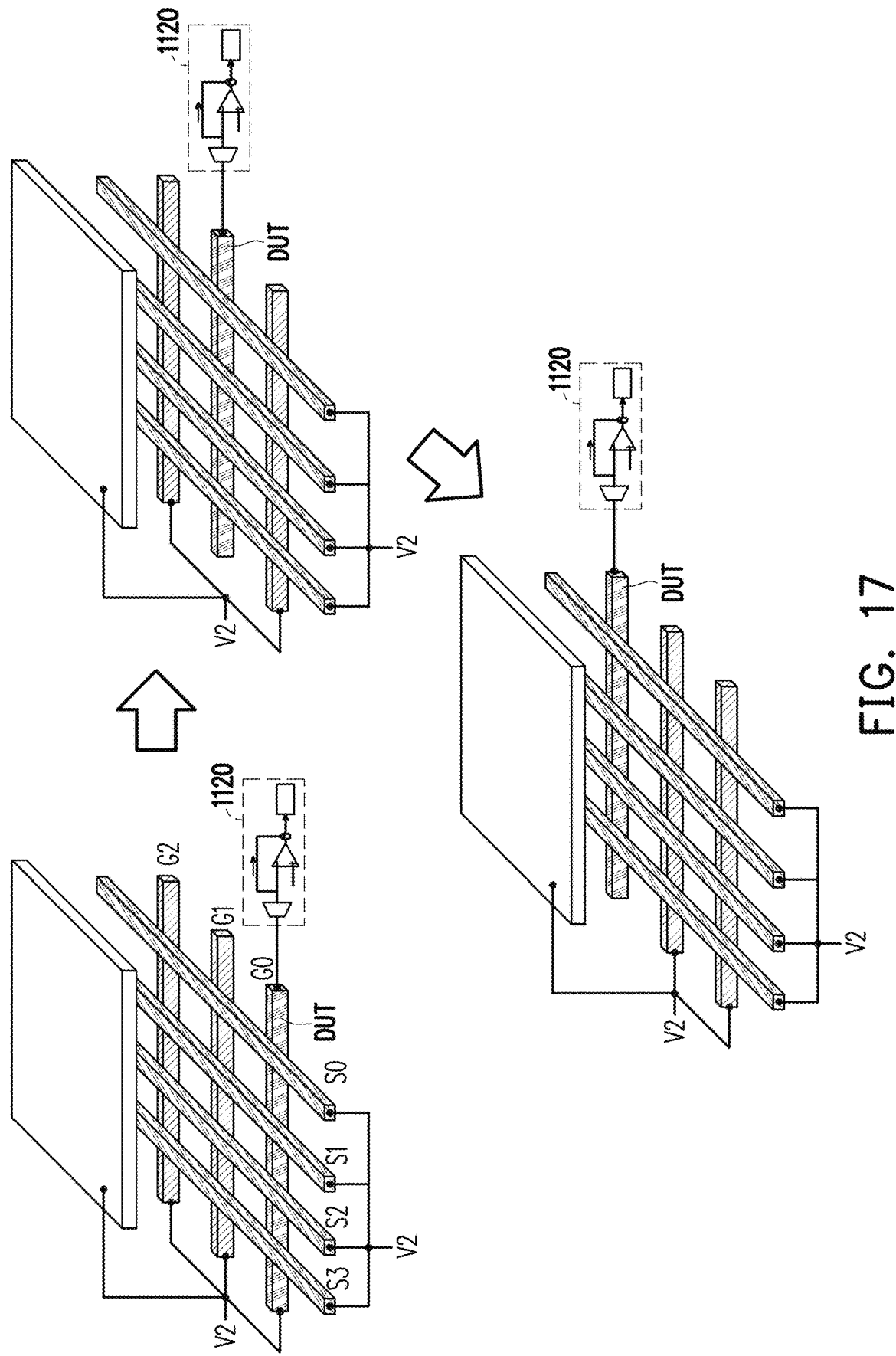
FIG. 17 is a schematic diagram illustrating gate lines are sequentially detected according to an embodiment of the invention.
Figure 18:
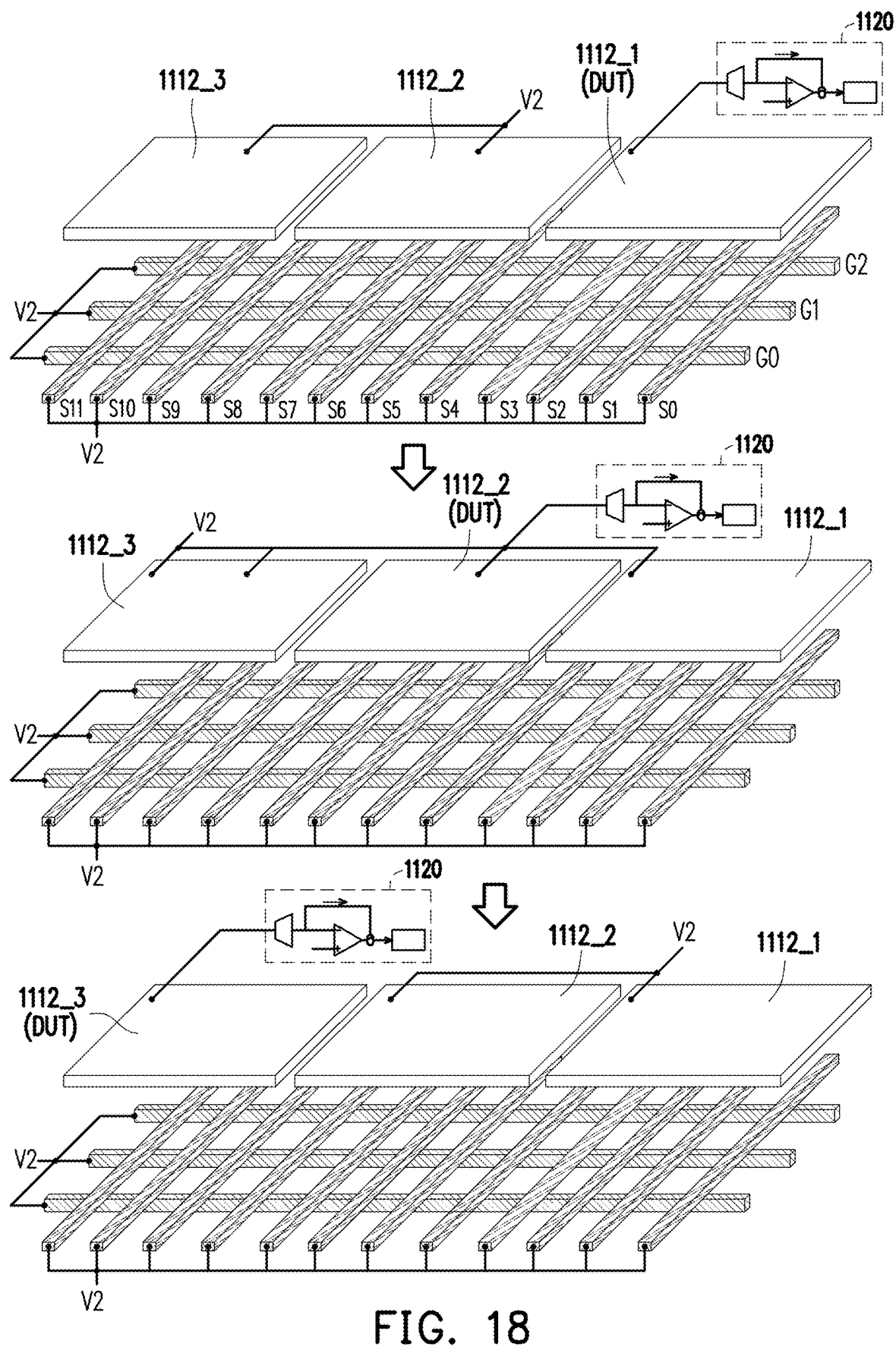
FIG. 18 is a schematic diagram illustrating sensing pads are sequentially detected according to an embodiment of the invention.

FIG. 16 is a schematic diagram illustrating source lines are sequentially detected according to an embodiment of the invention. Referring to FIG. 16, the source lines S0, S1, S2, S3 are sequentially detected. FIG. 17 is a schematic diagram illustrating gate lines are sequentially detected according to an embodiment of the invention. Referring to FIG. 17, the gate lines G0, G1, G2 are sequentially detected. FIG. 18 is a schematic diagram illustrating sensing pads are sequentially detected according to an embodiment of the invention. Referring to FIG. 18, the sensing pads 1112_1, 1112_2, 1112_3 are sequentially detected.

In FIG. 16 to FIG. 18, during the detection period, the first voltage V1 is sequentially applied to the DUT, and the second voltage V2 is applied to the reference devices.

In summary, in the embodiment of the invention, during the detection period, the driver circuit applies the first voltage to the DUTs, and applies the second voltage to the reference devices or make the reference devices be in the floating state or in the high impedance state, to obtain voltage information or capacitance information of the DUTs. The driver circuit can detect device abnormality of the touch display panel according to the voltage information or the capacitance information of the DUTs.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for detecting damages of a touch display panel, wherein the touch display panel comprises a plurality of sensing pads and a plurality of signal lines, the method comprising:
   selecting at least one first device of the sensing pads and the signal lines as a device under test (DUT);
   applying a first voltage to the DUT and receiving a feedback signal from the DUT, wherein the feedback signal comprises voltage information or capacitance information of the DUT; and
   determining whether the DUT is damaged according to the feedback signal,
   wherein the method further comprises
      applying a direct-current (DC) voltage to the DUT and receiving the voltage information of the DUT, and determining whether DUT is shorted according to the voltage information, and
      applying a load free driving (LFD) signal to the DUT and receiving the capacitance information of the DUT, and determining whether DUT is open itself according to the capacitance information.

2. The method for detecting the damages of the touch display panel according to claim 1, wherein the step of determining whether the DUT is damaged according to the feedback signal comprising:
   determining whether the DUT is open itself according to the capacitance information.

3. The method for detecting the damages of the touch display panel according to claim 2, wherein the capacitance information comprises a capacitance value between the DUT and a reference device, and the reference device is selected from the adjacent sensing pads or the adjacent signal lines.

4. The method for detecting the damages of the touch display panel according to claim 3, wherein the capacitance value is a first capacitance value in a normal state and a second capacitance value in an abnormal state, and the first capacitance value is larger than the second capacitance value.

5. The method for detecting the damages of the touch display panel according to claim 1, wherein the step of determining whether the DUT is damaged according to the feedback signal comprising:
   determining whether the DUT is shorted to the adjacent sensing pads or the adjacent signal lines according to the voltage information.

6. The method for detecting the damages of the touch display panel according to claim 5, wherein the voltage information comprises a voltage difference value between the DUT and a reference device, and the reference device is selected from the adjacent sensing pads or the adjacent signal lines.

7. The method for detecting the damages of the touch display panel according to claim 6, wherein the voltage difference value is a first voltage difference value in a normal state and a second voltage difference value in an abnormal state, and the first voltage difference value is larger than the second voltage difference value.

8. The method for detecting the damages of the touch display panel according to claim 1, further comprising:
   selecting at least one second device of the sensing pads and the signal lines as a reference device, wherein the capacitance information comprises a capacitance value between the DUT and the reference device, and the voltage information comprises a voltage difference value between the DUT and the reference device.

9. The method for detecting the damages of the touch display panel according to claim 8, wherein the reference device is adjacent to the DUT.

10. The method for detecting the damages of the touch display panel according to claim 8, further comprising:
   applying a second voltage to the reference device.

11. The method for detecting the damages of the touch display panel according to claim 8, further comprising:
   making the reference device be in a floating state or in a high impedance state.

12. The method for detecting the damages of the touch display panel according to claim 1, wherein the signal lines are source lines or gate lines of the touch display panel.

13. The method for detecting the damages of the touch display panel according to claim 1, further comprising:
   switching a switch circuit to apply the first voltage to the DUT or receive the feedback signal from the DUT.

* * * * *